United States Patent [19]
Read et al.

[11] Patent Number: 5,890,052
[45] Date of Patent: Mar. 30, 1999

[54] FOLDABLE WIRELESS TELEPHONE WALLET

[75] Inventors: Clifford D. Read, Stittsville; Jeffrey L. Fairless, Kanata; Desmond J. Ryan; Colin D. Smith, both of Ottawa; Brian F. Beaton, Orleans, all of Canada

[73] Assignee: Northern Telecom Limited, Montreal, Canada

[21] Appl. No.: 768,084

[22] Filed: Dec. 16, 1996

[51] Int. Cl.$^6$ ........................................ H04B 1/38
[52] U.S. Cl. ..................... 455/90; 455/575; 455/550; 379/440; D14/138
[58] Field of Search ............... 455/73, 90, 550, 455/566, 575; 379/110.01, 434, 440, 441; D14/137, 138, 140, 150

[56] References Cited

U.S. PATENT DOCUMENTS

| | | |
|---|---|---|
| D. 359,734 | 6/1995 | Nagele et al. ................. D14/138 |
| 4,724,527 | 2/1988 | Nishimura et al. ............... 364/705 |
| 5,221,838 | 6/1993 | Gutman et al. .................. 235/379 |
| 5,348,347 | 9/1994 | Shink ............................. 281/31 |
| 5,359,182 | 10/1994 | Schilling ....................... 235/380 |
| 5,371,797 | 12/1994 | Bocinsky, Jr. .................. 380/24 |
| 5,564,078 | 10/1996 | Nagai ............................ 455/89 |
| 5,657,370 | 8/1997 | Tsugane et al. ................ 455/550 |

*Primary Examiner*—Dwayne D. Bost
*Assistant Examiner*—Quochien B. Vuong
*Attorney, Agent, or Firm*—R. J. Austin; Angela C. de Wilton

[57] ABSTRACT

A portable wireless telephone structure in which a foldable wallet carries a telephone in addition to having a pocket to house paper currency. The telephone is exposed for use with the wallet in open condition and is housed with the wallet in closed condition. The telephone has a communication mode to a user monetary function to permit telephonic transfer of monetary units. Thus, the telephone may eliminate need for carrying credit or bank cards in the wallet except for the telephone use with a "smart" card for telephonic transfer of monetary amounts to the "smart" card for transaction purposes.

11 Claims, 3 Drawing Sheets

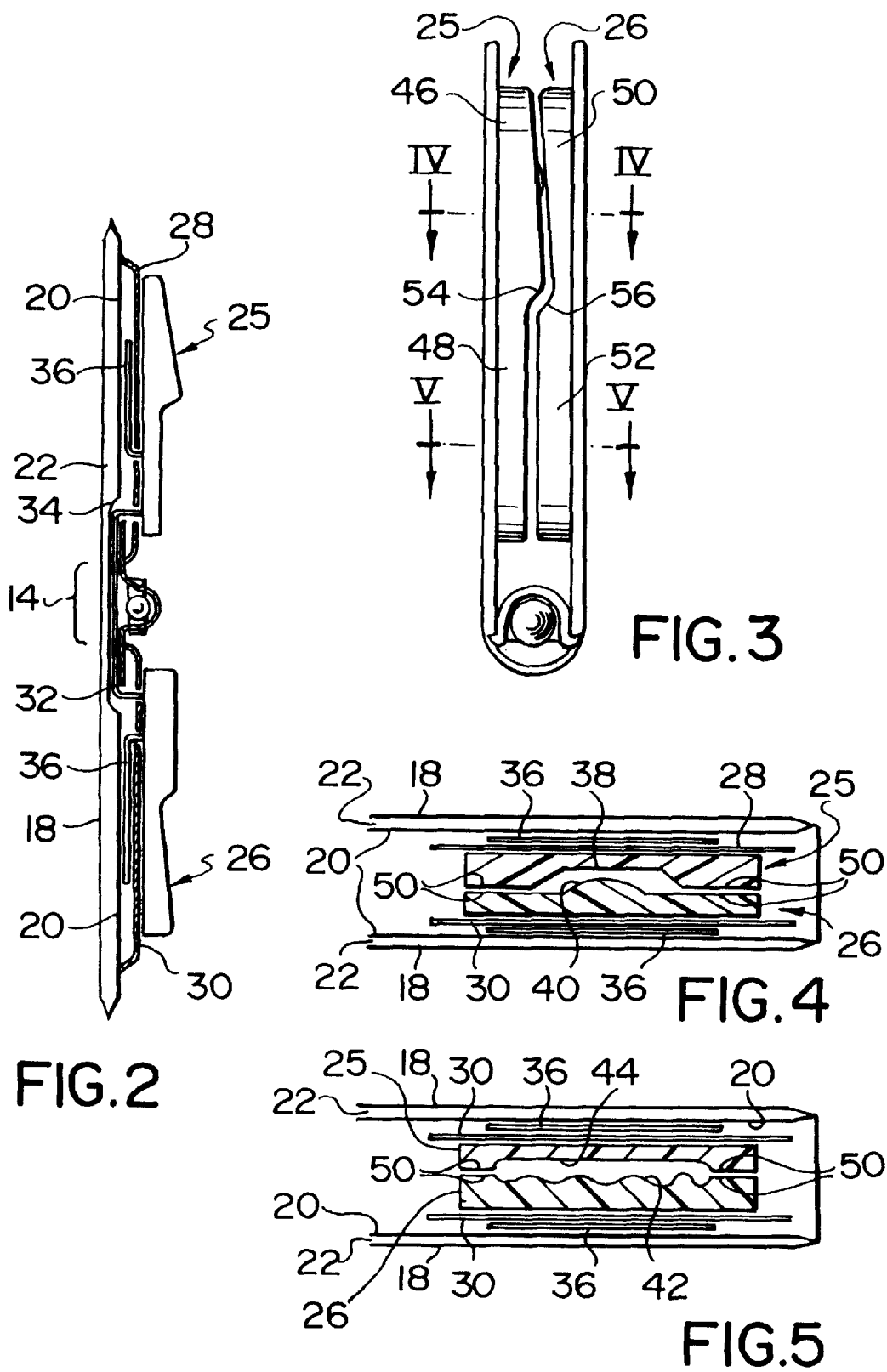

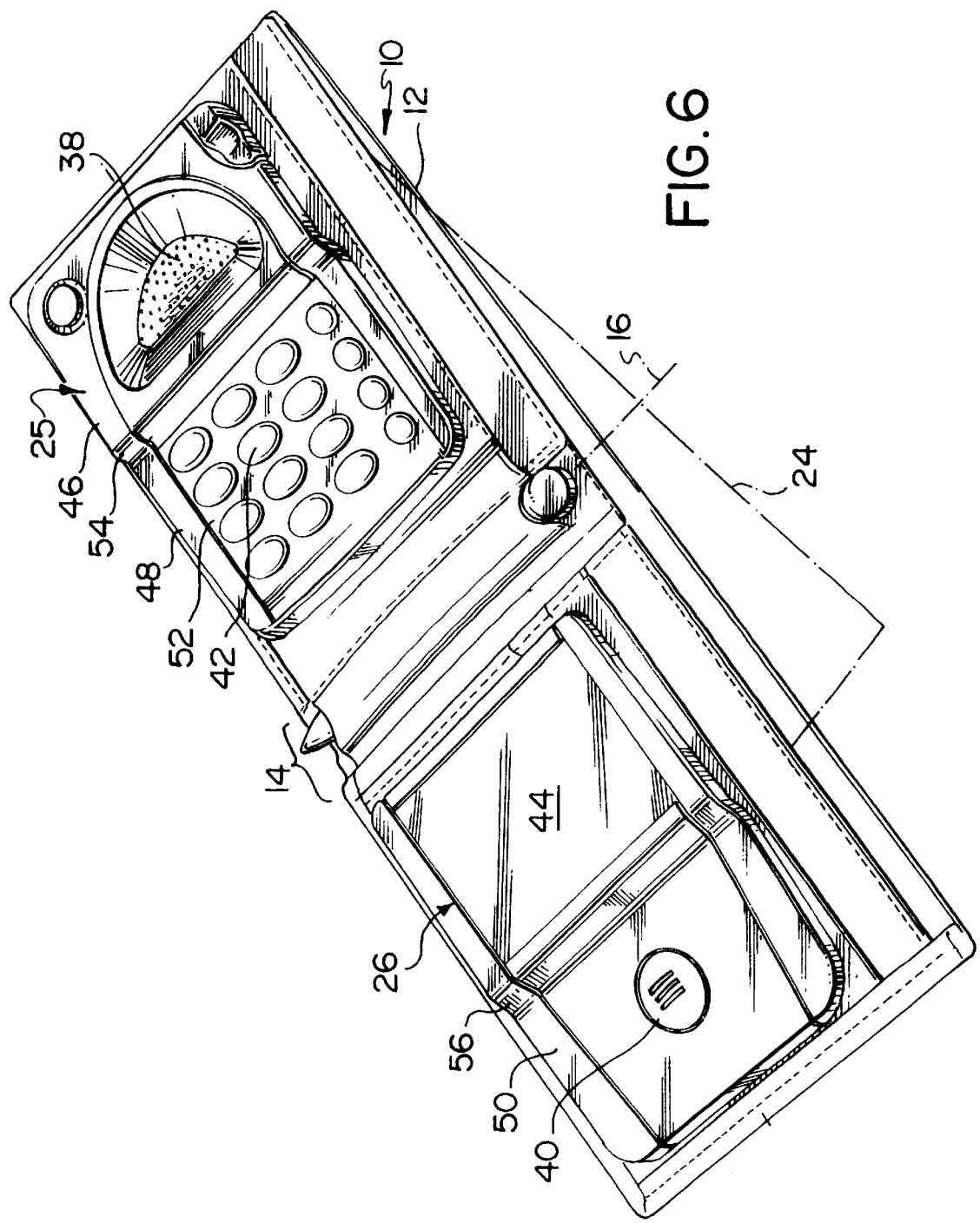

FOLDABLE WIRELESS TELEPHONE WALLET

FIELD OF THE INVENTION

This invention relates to portable wireless telephone structures.

BACKGROUND OF THE INVENTION

Portable wireless telephone structures are becoming increasingly common and are conventionally for use in either a cell telephone environment or in a wireless telephone environment having radio connection with a telephone base station. Unfortunately, such wireless telephone structures add to the bulk which a user needs to carry with him. It would be convenient therefore for a wireless telephone structure to be provided in such a manner that any increase in bulk is minimized or is largely insignificant.

The present invention seeks to provide a portable wireless telephone structure which has the above convenient advantages.

SUMMARY OF THE INVENTION

Accordingly, the present invention provides a portable wireless telephone structure comprising:- a wallet having a foldable region and a pocket to house paper currency; and a telephone carried by the wallet and being housed by the wallet with the wallet in a folded condition and exposed for telephone usage with the wallet in unfolded condition, the telephone having a communication mode to a user monetary function to permit telephonic transfer of monetary units as permitted by the function.

As may be seen, a portable wireless telephone structure according to the invention as defined above provides a single unit of a telephone and wallet for carrying currency as compared to a conventional usage in which a telephone is carried separately from the wallet and is stored as a separate article. Further to this, and of importance, the telephone of the invention above in having a communication mode to a user monetary function, may result in the avoidance of the need for the owner to carry (or perhaps need to own) bank cards or credit cards. The invention thus enables minimization in the amount of items which would otherwise need to be stored in the wallet with the attendant risk that such items could become lost or stolen. Elimination of such cards necessarily reduces the bulk normally carried by the wallet and counterbalances, at least to an extent, the bulk added to the wallet by the telephone in making the unitary structure of the invention. Should the telephone be minimized in thickness, it should be noted that the portable wireless telephone structure in some arrangements of the invention could result in a structure which is of no greater bulk than a normal wallet which is filled with personal items of the user including a multitude of bank or credit cards. Thus, the invention defined above enables the owner not only to employ the telephone for transfer of monetary amounts, but also enables for access to the monetary function by the owner with a personal user (or pin) number to be dialed into the telephone before the monetary function can be activated. The structure may thus be completely guarded against monetary loss in the event that the telephone structure becomes lost or stolen, with the comforting knowledge that any third party is unaware of the access or pin number of the owner. In essence, therefore, the telephone structure may be used in conjunction with a "smart" card for transferring monetary amounts to the smart card to be used for transaction purposes.

In a practical construction, the telephone comprises two parts each including operative elements of the telephone and disposed one of each side of the foldable region, the two parts electrically connected together by a flexible electrical conductor means extending through the foldable region. Conveniently, one of the two telephone parts includes an operative element consisting of a telephone speaker and the other part includes an operative element in the form of a telephone transmitter. It is also convenient for the telephone part including the speaker also to carry a dial pad. In a very practical construction, the speaker and transmitter are disposed at remote ends of the two parts so as to lie in positions for simultaneous alignment both with the user's ear and his mouth for normal telephone usage. In this regard, the foldable region of the wallet is of importance in that it enables the two parts of the telephone to be changed in angle relative to each other so as to adapt the telephone structure to the facial contours of the user's face for most comfort in operation. It is also convenient in such an arrangement that the part of the telephone equipped with the transmitter also includes a display screen.

In a further practical arrangement, the two telephone parts have confronting surfaces which engage one another to protect the operative elements of the telephone from applied pressure. Registration means for the two telephone parts may also be included and which may be at least partly provided by the confronting surfaces, to register the two together in the folded condition of the wallet so as to resist twisting of the wallet in that condition.

The invention also includes a portable wireless telephone structure comprising in combination, a wallet having a foldable region and a pocket to house paper currency; and a telephone carried by the wallet, the telephone comprising two parts each including operative elements of the telephone and disposed one on each side of the foldable region, the two parts electrically connected together by flexible electrical conductor means extending through the foldable region.

BRIEF DESCRIPTION OF THE DRAWINGS

One embodiment of the invention will now be described, by way of example, with reference to the accompanying drawings, in which:

FIG. 2 is a cross-sectional diagrammatic view taken along line II—II in FIG. 1 of the structure and in open condition;

FIG. 3 is a side elevational view of the structure with the wallet in closed condition; and FIGS. 4 and 5 are cross-sectional views to a larger scale and taken along lines IV—IV and V—V in FIG. 3.

FIG. 6 is an isometric plan view similar to FIG. 1, however the screen and keypad positions have been switched.

DETAILED DESCRIPTION OF THE PREFERRED EMBODIMENT

Figure 1:
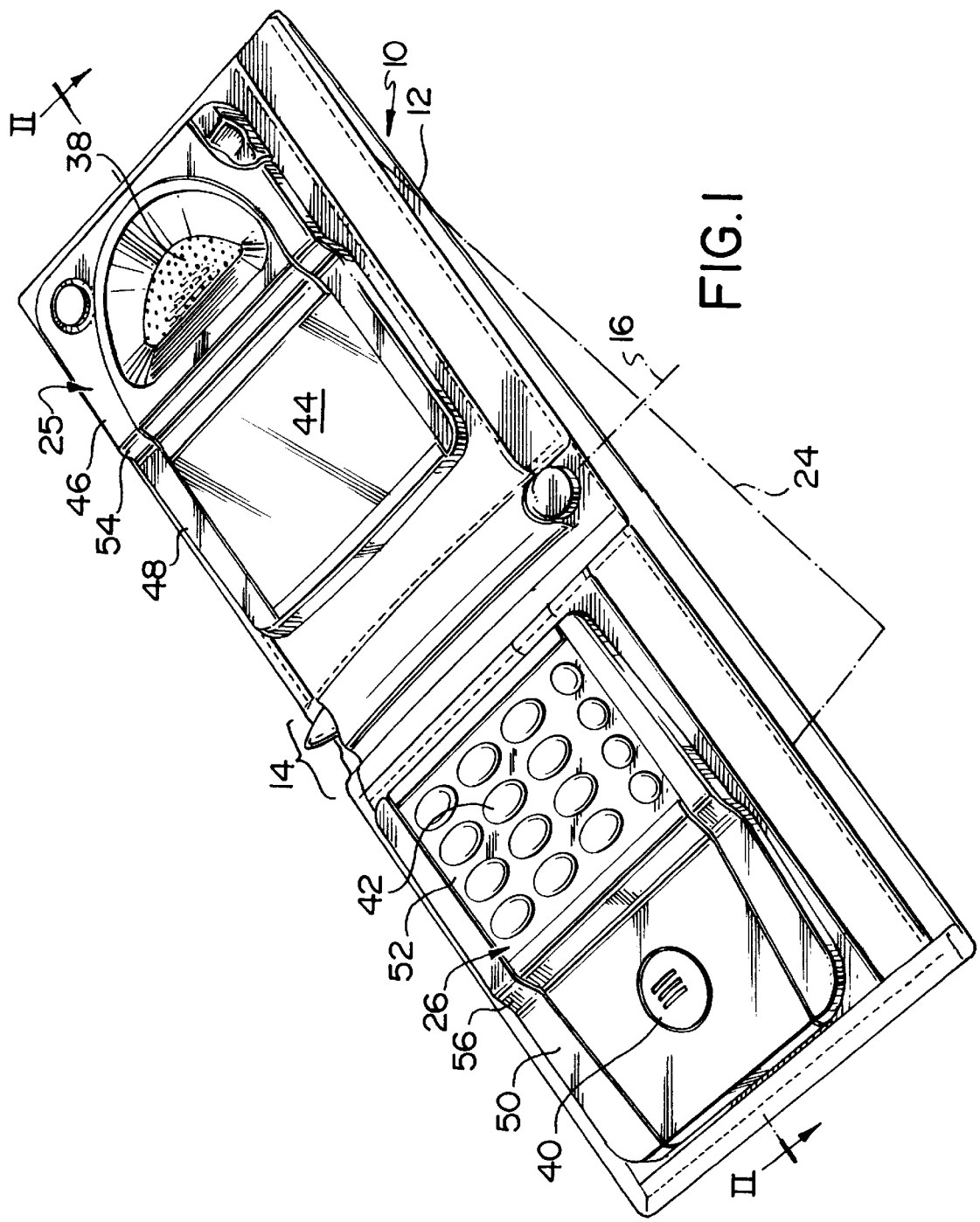
FIG. 1 is an isometric plan view of a portable wireless telephone structure of the embodiment incorporating a wallet shown in an open position and with parts removed to show detail.

In the embodiment as shown mainly in FIGS. 1, 2, and 3, a portable wireless telephone structure 10 comprises a flexible leather or plastic pocket wallet 12 having a foldable region 14 foldable about a center line 16 as shown. As shown more clearly in FIG. 2, the wallet 12 has a back plane 18 extending for the full length of the wallet and a confronting more forwardly positioned panel 20 sewn at its ends to the back panel 18 to provide a pocket 22 extending for the full length of the wallet for the storage of bank notes as indicated for example at item 24 in chain-dotted outline in FIG. 1.

Forwardly of the panel 20 i.e. on the opposite side of the panel from the panel 18, is located a wireless telephone structure. This telephone structure comprises two parts 25 and 26 which are mounted upon individual flaps 28 and 30 of the wallet. The flaps 28 and 30 are positioned one on each side of the foldable region 14 of the wallet and each flap is attached at its ends, as by stitching, to the panel 20. The two parts 25 and 26 of the telephone are intended to cooperate as in a normal telephone operation and for this purpose, a flexible cable 32 is used operatively to connect the electrical and electronic equipment in the parts 25 and 26. Flexible cable 32 is a flat cable incorporating a plurality of flexible electrical connectors (see FIG. 1) extending from end-to-end of the cable from one part of the telephone to the other. For convenience in this structure, the cable 32 extends behind the flap 20 and is enclosed by a subsidiary flap 34 to separate it from the pocket 22 thereby preventing any interference with the cable with the movement of bank notes into and out of the pocket. It is necessary of course for the cable 32 to extend through a slot in the panel 20 and through the flaps 28 and 30 into electrical connection with the parts 25 and 26 of the telephone. This is indicated in FIG. 3 which is a diagrammatic representation of a section through the wallet.

Each of the parts 25 and 26 may be retained in position upon its flap 28 or 30, as the case may be by any desirable means. As shown in the embodiment, for securing purposes a resilient metal or plastic clip 36 extends rearwardly of each part 25 and 26, each clip 36 extending through a slot in its respective flap 28 or 30 for location behind the flap to secure the part 25 or 26 in position. Alternatively, other means may be used. For instance, conveniently hook and loop type fastener elements provided upon planar backings and of a construction for instance as made by Velcro Industries may be used. For each telephone part 25 and 26, such a fastener may have one of its elements adhesively secured to the forwardly facing surface of the flap 28 or 30 with the other element secured to the rear surface of the telephone part 25 or 26.

As may be seen from the drawings, the telephone part 25 comprises a telephone speaker 38 and the telephone part 26 has a transmitter 40 facing outwardly from these parts in a direction away from the wallet. In addition, the part 26 includes a dial pad 42 and the part 25 is equipped with a display screen 44. The display screen is touch sensitive, although this is of course not essential. The speaker and the transmitter are positioned at remote ends of the two parts 25 and 26 of the telephone, being disposed a distance apart to be substantially consistent with the distance between the mouth and the ear of a user. It will be noticeable that with the use of the foldable wallet, that the parts 25 and 26 may be positioned in any desired relative angular orientation to accommodate the shape of the user's face so as to locate the transmitter and speaker respectively close to the mouth and ear of the user. FIG. 6 shows a telephone similar to FIG. 1, however the screen and keypad positions have been switched.

With the wallet in folded condition, such as shown by FIG. 3, the parts 25 and 26 are oriented around the foldable region 14 so as to confront each other. Of particular interest is the manner in which this confrontation is used. For instance, a registration means is provided between the two parts 25 and 26 which provides a certain rigidity to the total structure to prevent twisting of the wallet about the flexible region 14. In this regard, the region 46 of the part 25 and carrying the speaker 38 is thicker in section than the region 48 providing the display screen 44. On the other hand, the transmitter 40 of the part 26 is disposed in a thinner region 50 of that part than the region 52 which carries the dial pad 42. These differences in thickness are accommodated in part 25 by a step 54 and in the part 26 by a step 56. As shown by FIGS. 3, 4 and 5 with the wallet in closed and folded condition the two stepped surfaces of the parts 25 and 26 lie around their edges in substantially intimate contact with the steps 54 and 56 lying in closely confronting relationship and fitting into one another. This interaction between the two steps 54 and 56 provides a registration means which resists twisting of the wallet in the closed condition.

In addition, as shown by FIGS. 4 and 5, the two parts 25 and 26 have upstanding marginal edge regions 50 upon their confronting surfaces which in the folded condition of the wallet engage each other. These upstanding marginal edge regions result in the dial pad 42, the speaker 38 and the display screen 44 lying in dished regions of their respective parts so that clearances are provided with the confronting surfaces of the parts 25 and 26 brought together. This therefore acts as a protection for the exposed operational elements of the telephone when not in use. The transmitter 40 also may be recessed in the same manner, but as shown by FIG. 5 it does in the embodiment lie slightly proud from the surface of the part 26. However, this is of no due concern as the transmitter merely fits into a dish formation formed by the marginal edges of the part 26 and is spaced away from the speaker 38.

As may be seen therefore the structure of the embodiment provides a single unitary construction of wallet with a portable telephone. It provides a portable wireless telephone structure incorporating a wallet. With the use of the embodiment as with the invention, the structure of telephone and wallet provides a single article of bulk for a user as distinct from two separate bulky articles which are normally provided, i.e. a wallet and a separate telephone presumably carried in different parts of the user's clothing. In addition, the wallet may carry bank and credit cards of the user. However, it is a particular feature of the embodiment that the telephone has a communication mode to a user monetary function in his personal banking account. This permits telephonic transfer of monetary units as permitted by that function. In a particular case, it may merely be necessary for the user to carry in the wallet (besides bank notes) a "Smart" Card (not shown) to which monetary amounts may be transferred from his bank account for transaction purposes by use of the telephone incorporated in the structure. It follows therefore that the use of the embodiment with such telephonic usage makes it possible to avoid the necessity of carrying bank or credit cards in addition to the "Smart" Card. Hence, the normal bulk of such cards is omitted from the bulk of the total structure. Apart from storage of bank notes as required by the user, therefore, the only additional bulk required with the structure of the embodiment is a single card (e.g. a "Smart" Card) for use with the telephone for transaction purposes.

The structure of the embodiment does therefore provide an arrangement with the interbanking telephonic arrangement that avoids unnecessary clutter being stored within the wallet thereby minimizing bulk. In addition, the incorporation of the telephone in two parts, one at each side of the foldable region, provides an arrangement which is easily flexible within the hands of the user for comfortable use as a telephone to accommodate itself to the shape of the user's face.

What is claimed is:

1. A portable wireless telephone structure comprising in combination:

a wallet having a foldable region and a pocket to house paper currency;

and a telephone carried by the wallet, the telephone comprising two parts each including operative elements of the telephone and disposed one on each side of the foldable region, the two parts electrically connected together by flexible electrical conductor means extending through the foldable region.

2. A portable wireless telephone structure comprising:

a wallet having a foldable region and a pocket to house paper currency;

and a telephone carried by the wallet and being housed by the wallet with the wallet in a folded condition and exposed for telephonic usage with the wallet in the unfolded condition, the telephone having a communication mode to a user monetary function to permit telephonic transfer of monetary units as permitted by that function, the telephone comprising two parts, each carrying operative elements of the telephone and disposed one on each side of the foldable region, the two parts electrically connected together by flexible electrical conductor means extending through the foldable region.

3. A structure according to claim 2 wherein one of the two parts has an operative element consisting of a telephone speaker and the other part has an operative element in the form of a transmitter.

4. A structure according to claim 3 wherein the speaker and the transmitter are separated a distance apart to be substantially consistent with the distance between the mouth and ear of a user, and the foldable region enables a change in relative angular orientation of the parts to conform to the shape of the face of the user.

5. A structure according to claim 3 wherein the part of the telephone having the speaker also carries a dial pad.

6. A structure according to claim 3 wherein the part of the telephone having the transmitter also includes a display screen.

7. A structure according to claim 2 wherein, with the wallet in folded condition, the two parts have confronting surfaces which engage one another to protect the operative elements of the telephone from applied pressure.

8. A structure according to claim 7 wherein the telephone comprises operative elements in the form of a telephone speaker and a transmitter provided one in each of the parts, and with the wallet in folded condition the speaker and transmitter confront one another and are maintained spaced-apart by the confronting engaging surfaces of the parts.

9. A structure according to claim 7 wherein one of the parts also includes a dial pad and the other part includes a display screen, the dial pad and display screen confronting one another with the wallet in folded condition and being maintained spaced-apart by the confronting engaging surfaces of the housing.

10. A structure according to claim 2 wherein the two parts have surface registration means to register them together in the folded condition of the wallet to resist twisting of the wallet in the foldable region.

11. A structure according to claim 10 wherein the surface registration means is provided by a step in a surface of each part which confronts the other part with the wallet in folded condition, the two steps fitting into one another to resist twisting of the wallet in the foldable region.

* * * * *